United States Patent
Stevenson et al.

(10) Patent No.: US 9,780,451 B2
(45) Date of Patent: Oct. 3, 2017

(54) TUNABLE RESONATOR DEVICE AND METHOD OF MAKING SAME

(71) Applicants: Ryan A. Stevenson, Maple Valley, WA (US); Chris Lorkowski, Kirkland, WA (US); Nathan Kundtz, Kirkland, WA (US); Witold Teller, Kirkland, WA (US)

(72) Inventors: Ryan A. Stevenson, Maple Valley, WA (US); Chris Lorkowski, Kirkland, WA (US); Nathan Kundtz, Kirkland, WA (US); Witold Teller, Kirkland, WA (US)

(73) Assignee: KYMETA CORPORATION, Redmond, WA (US)

(*) Notice: Subject to any disclaimer, the term of this patent is extended or adjusted under 35 U.S.C. 154(b) by 280 days.

(21) Appl. No.: 14/532,799

(22) Filed: Nov. 4, 2014

(65) Prior Publication Data
US 2015/0123748 A1    May 7, 2015

Related U.S. Application Data

(60) Provisional application No. 61/900,287, filed on Nov. 5, 2013.

(51) Int. Cl.
| | |
|---|---|
| H01Q 9/04 | (2006.01) |
| H01P 7/08 | (2006.01) |
| H01P 11/00 | (2006.01) |
| B32B 37/12 | (2006.01) |
| H01P 7/06 | (2006.01) |

(52) U.S. Cl.
CPC .......... *H01Q 9/0407* (2013.01); *H01P 7/088* (2013.01); *H01P 11/008* (2013.01); *B32B 37/1292* (2013.01); *B32B 2305/55* (2013.01); *B32B 2457/00* (2013.01); *H01P 7/06* (2013.01); *H01P 7/065* (2013.01)

(58) Field of Classification Search
CPC .. H01P 7/065; H01P 7/088; H01P 7/08; H01P 11/008; H01Q 9/0407; H01Q 9/0414; H01Q 9/0442; H01Q 9/0464; B32B 37/1292; B32B 2457/00; B32B 2305/55
USPC .......... 333/161, 235, 236, 238; 343/700 MS
See application file for complete search history.

(56) References Cited

U.S. PATENT DOCUMENTS 6,545,739 B1 *    4/2003    Matsumoto ........ G02B 6/29358
                                                             349/198

* cited by examiner

*Primary Examiner* — Benny Lee
*Assistant Examiner* — Jorge Salazar, Jr.
(74) *Attorney, Agent, or Firm* — Blakely, Sokoloff, Taylor & Zafman LLP (57) ABSTRACT

Techniques and mechanisms for providing a tunable RF resonator device. In an embodiment, a patterned layer of an adhesive material is disposed on a side of a panel comprising a substrate and a metal layer. A membrane is aligned between the panel and another panel. A laminate is formed with the first panel, the second panel and the membrane, where an intermediate layer of the laminate includes a first portion comprising a liquid crystal channel, and a second portion comprising adhesive material disposed in interstices of the membrane. In another embodiment, the second portion forms at least part of a boundary to the liquid crystal channel.

22 Claims, 8 Drawing Sheets

TUNABLE RESONATOR DEVICE AND METHOD OF MAKING SAME

RELATED APPLICATIONS

This application is a nonprovisional application based on U.S. Provisional Patent Application No. 61/900,287 filed Nov. 5, 2013, and claims the benefit of priority of that provisional application. Provisional Application No. 61/900,287 is hereby incorporated by reference.

BACKGROUND

1. Technical Field

Embodiments discussed herein generally relate to integrated electronic resonator devices. More particularly, certain embodiments include, but are not limited to, a tunable resonator device including a membrane material interspersed within a liquid crystal channel.

2. Background Art

Variable delay line devices are one example of integrated electronic hardware that has, over the past few years, incorporated mechanisms wherein a porous membrane is infused with a nematic liquid crystal (LC) material. During operation of such a device, an electrical field can be applied to induce an at least partial alignment of polar LC molecules. This alignment results in a change to the permittivity of the LC material, which in turn results in different delay line (or other) characteristics of the device.

Successive generations of integrated electronic devices continue to scale in size and speed. Moreover, the performance requirements demanded by various use cases for such devices continue to become more stringent. There remains a demand to have tunable electronic mechanisms work in and/or with such faster, smaller or otherwise more efficient next generation of integrated electronic devices. However, the industry is beginning to reach limits of existing technologies for fabricating tunable electronic devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms to efficiently incorporate a porous film as an interstitial material between panels (e.g., printed circuit boards, glass, flexible substrate material etc.) of a resonator device such as a metamaterial surface antenna of a printed circuit assembly. Such techniques and mechanisms variously improve characteristics—e.g. decay time and/or control thereof—of a liquid crystal (LC) channel in any of a variety of tunable radio frequency (RF) devices. These tunable RF devices may include, but are not limited to, any of various microstrip-based or stripline-based devices having a porous membrane sandwiched between a signal plane and a reference (e.g., ground voltage) plane.

For example, a tunable RF device according to an embodiment may operate to support millimeter, microwave and/or other applications—e.g. wherein a liquid crystal cell gap of the RF devices is equal to or greater than 25 microns. In one embodiment, a surface scattering antenna includes resonant antenna structures evanescently coupled to microstrip guided wave structures including an interstitial material between a microstrip metal and a ground plane metal. In another embodiment, a surface scattering antenna device according to an embodiment may include resonant antenna elements evanescently coupled to stripline structures, where an interstitial material is placed above and below a stripline metal. A tunable RF device may support operation in any of a variety of regions of the RF spectrum—e.g., including some or all of a microwave range, some or all of a millimeter range, etc.

In previous designs of tunable resonator devices, no porous interstitial material is used, and the decay speed of a bulk LC material was very slow. More recently, decay speed improvements have been achieved using porous membranes infused with LC material. However, techniques to efficiently incorporate such membranes during device fabrication have been lacking. Certain embodiments variously include techniques (and/or corresponding structures resulting from such techniques) wherein a porous or fibrous membrane is efficiently integrated into a gap between rigid or flexible panels—e.g. including a patch printed circuit board and an iris printed circuit board—of a resonator device. Such panels may include, for example, boards such as printed circuit boards, glass, flexible substrates—such as one made of polyethylene naphthalate (PEN) for flexible display applications—or other suitable structures. In some embodiments, a membrane material may be infused with a LC material in batch processes and stored for future use—e.g. where the membrane may be integrating in an antenna device or other tunable RF device by laminating the LC-infused membrane material between two such panels.

The membrane may comprise a low dielectric constant, low loss tangent material, such as expanded polytetrafluoroethylene (PTFE) or expanded UHMWPE (ultra high molecular weight polyethylene). Alternatively, the membrane may comprise microfibers and/or nanofibers—e.g., including stranded materials comprising nylon, polyester, polypropylene, and/or the like to be used as an intermediary material. The membrane material may provide stability to the LC matrix of a large cell gap RF device—e.g. where the LC matrix might otherwise by characterized by multiple domains and grain boundaries between such domains. This stability may result from the membrane supporting an improved ordering of a nematic LC state that, for example, results in lower RF losses and faster relaxation speed.

Certain embodiments are discussed herein with respect to a resonator device comprising boards and a porous membrane between such boards, wherein the resonator device provides RF signal communication mechanisms such as a patch antenna. However, such discussion may be extended to additionally or alternatively apply to any of a variety of other resonator device types—e.g., where a resonator device includes boards or any of various other panels, a porous or fibrous membrane, supports RF or optical signaling and/or includes any of various other antenna, delay line or other mechanisms.

Figure 1A:
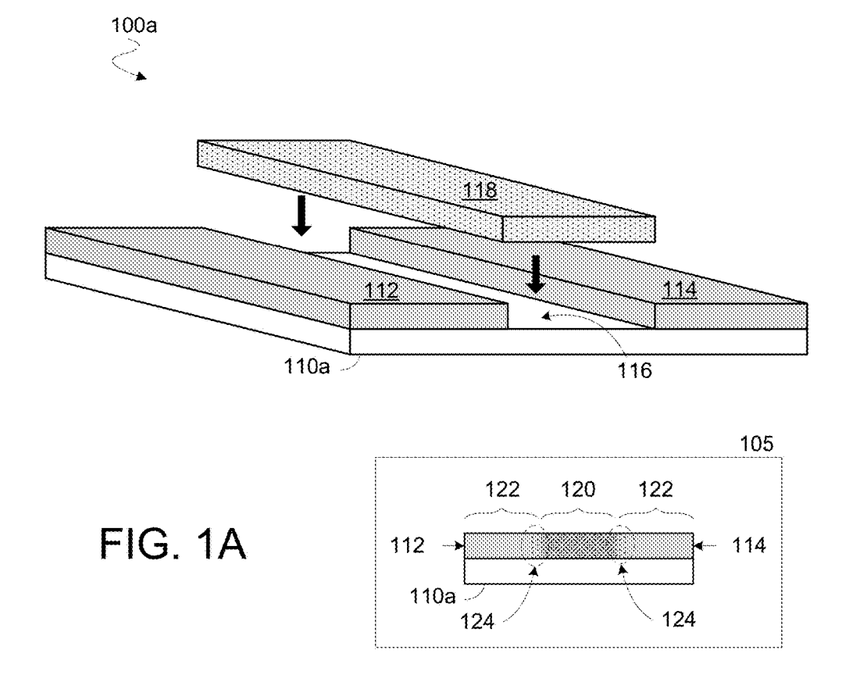
FIGS. 1A and 1B are high-level views each illustrating elements of a respective stage of fabrication for a tunable resonator device according to an embodiment.
Figure 1B:
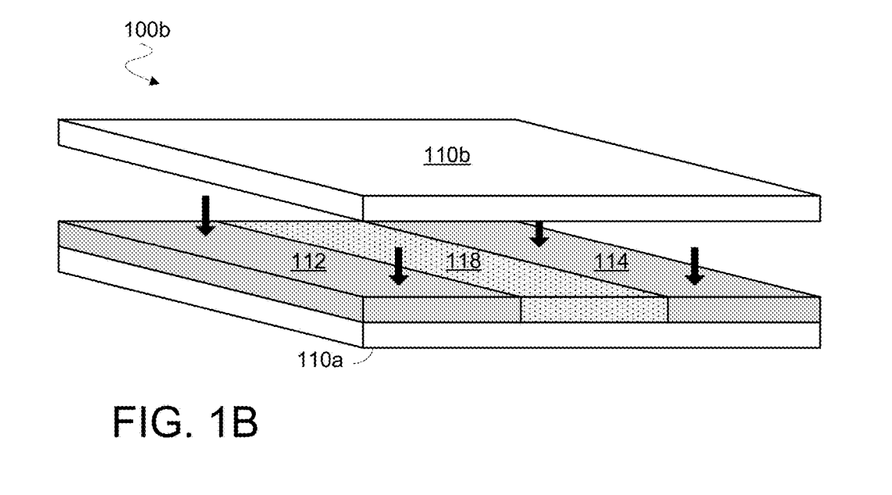

FIGS. 1A and 1B illustrate features of a process, according to one embodiment, to fabricate a tunable RF resonator device. In the process represented with FIGS. 1A, 1B, a gasket (or other such structure) comprising adhesive material may be formed to define at least part of a boundary of a LC channel, where a piece of membrane material is shaped to the fit within the structure to support operation of the LC channel therein.

FIG. 1A shows a stage 100a of fabrication during which a patterned layer of adhesive material is disposed on a side 116 of a first board 110a. Regions 112, 114 may be in contact with one another at another part of surface 116 (not shown) to form a contiguous adhesive region that, for example, defines a gasket in which a membrane 118 may be placed. In another embodiment, regions 112, 114 are not in direct contact with one another. A portion of side 116 may remain exposed by the patterned layer of adhesive material—e.g., where that portion is instead to be covered by a membrane 118. As shown in the detailed cross-sectional view 105, regions 112, 114 may define at least in part one or more channel boundary regions 122 that adjoin and limit the extent of a region 120 that is to accommodate a LC channel.

As discussed herein, a board such as first board 110a may include component structures (not shown) including, for example, a circuit board substrate and one or more metal layers disposed therein and/or thereon. First board 110a may serve functionally as either one of a signal board and a reference (e.g., ground) board for a tunable antenna of the resonator device. By way of illustration and not limitation, first board 110a may be either one of an iris board and a patch board of a patch antenna device.

A circuit board substrate of first board 110a (and/or of second board 110b) may include, for example, any of a variety of known substrate materials, such as one of various materials (e.g., RO4003C™, RO4350B™, RT/Duroid® 5880, etc.) made by Rogers Corporation of Rogers, Conn. Alternatively or in addition, a metal layer of first board 110a may include copper (or copper plated with gold or silver) having a thickness that, for example, is in a range of 9-18 microns (µ). The metal layer thickness may be equal, for example, to 5 skin depths at a signal wavelength that is supported by the resonator device. However, such a substrate and/or metal layer of first board 110a may have any of a variety of other dimensions and/or materials, according to implementation-specific details that are not limiting on certain embodiments.

The patterned layer comprising regions 112, 114 may include, for example, any of the variety of known adhesive materials including, but not limited to, various A-stage or B-stage epoxies, A-stage or B-stage acrylics, PCB pre-impregnated (pre-preg) materials, pressure sensitive acrylic (PSA) tapes, etc. Membrane 118 may include expanded PTFE (ePTFE) or any of various other microporous materials, as discussed herein. One factor in selecting a porous material for membrane 118 may be a porosity or void density of the material. For example, a material with a void density equal to or greater than 80% may be particularly beneficial in surface scattering applications, which rely heavily on a relatively wide tuning range. Additionally or alternatively, it may be desirable for a material of membrane 118 to have a low RF loss tangent, to have a dielectric constant comparable to that of the LC material, and/or to have a good surface anchoring energy.

In another embodiment, membrane 118 comprises a fibrous material—e.g., a non-woven electrospun material that forms randomized and/or aligned collections of nanofibers. Such nanofibers may, for example, comprise polyamide, polymethylmethacrylate (PMMA), polyethersulfone (PES), or other suitable materials. Aligned fibers may provide for comparatively better alignment for LC material of the LC channel.

The patterning of regions 112, 114—and/or the shape of membrane 118—may be achieved, for example, with laser-cutting, die-cutting, etc. Regions 112, 114 may alternatively be disposed as wet adhesive that, for example, is screen printed with a stencil to define a boundary of the LC channel. In one illustrative embodiment, the exposed portion of side 116 between regions 112, 114—a region that is to accommodate membrane 118—is 3 mm wide and 55 cm long. However, such dimensions may vary, according to implementation-specific details. In such an embodiment, the laminate device resulting from such processing may be subsequently diced or otherwise cut to form multiple separate resonator devices. Although a straight LC channel region is shown, any of a variety of curved, angled or other additional or alternative LC channel geometries may be provided, according to different embodiments.

As shown in FIG. 1B, a second board 110b may be brought into contact with regions 112, 114 at a stage 100b for adhesion to first board 110a and/or membrane 118. Second board 110b may provide a functionality that is complementary to that of first board 110a—e.g. where first board 110a and second board 110b are, respectively, an iris board and a patch board. The boards 110a, 110b, regions 112, 114 and membrane 118 may be aligned relative to one another with tooling fixtures—e.g., by processes including operations adapted from conventional alignment techniques. The resulting assembly formed by stage 100b may be cured—e.g., with heat, pressure, ultra-violet radiation or the like—to form a laminate. For example, the aligned components may be placed in a hot press to perform the lamination.

Subsequently, membrane 118 may be infused with a liquid crystal material to form a LC channel between regions 112, 114. The liquid crystal material may be highly polar to facilitate, for example, precise and/or responsive tuning of LC channel permittivity. Any of the variety of known high-birefringence liquid crystal materials may be used—e.g., 4-Cyano-4'-pentylbiphenyl and/or the like. The particular LC material may not be limiting on certain embodiments.

After infusion of the LC material, the resulting LC channel may be bounded at least in part by areas wherein adhesive material is disposed within micropores of the microporous membrane 118. For example, as shown in cross-sectional view 105, deposition of adhesive material in micropores of areas 124 may limit the extent to which an LC material may be infused into the RF device. The use of adhesive layer patterning to define LC channel areas for membrane 118 allows for highly precise LC channel positioning, dimensioning, etc. Alternatively or in addition, such techniques allow for the formation of a very thin LC channel between boards 110a, 110b, wherein the LC channel is bounded in a thin membrane only by adhesive material.

The resulting structures may provide for biasing of the LC channel to facilitate an ability to tune the RF device in one or more respects. For example, the RF device may include a surface scattering antenna including one or more resonant antenna elements. At each such resonant antenna element, an amplitude of radiated energy may be selectively tuned by adjusting a respective voltage on a corresponding liquid crystal cell portion. Such tuning may change a capacitance of an antenna element, which shifts a resonant frequency of that antenna element. In such an embodiment, the incorporation of a microporous membrane 118 may reduce tuning delay, error, etc. by improving displacement of the LC material. Although certain embodiments are not limited in this regard, a surface scattering antenna may support beam forming, for example, by implementing a phase hologram wherein respective resonances of different antenna elements are tuned—e.g. for a 180 degree phase change between adjacent elements. In another embodiment, a delay line with tunable phases may be implemented.

FIGS. 2A through 2D illustrate features of a process to fabricate a tunable resonator device according to another embodiment. In the process represented with FIGS. 2A through 2D, a patterned layer of adhesive material is disposed across a section of a board, where a portion of the adhesive material is to overlap with a membrane of porous material. This process may include, for example, one or more features discussed herein with respect to stages 100a, 100b.

Figure 2A:
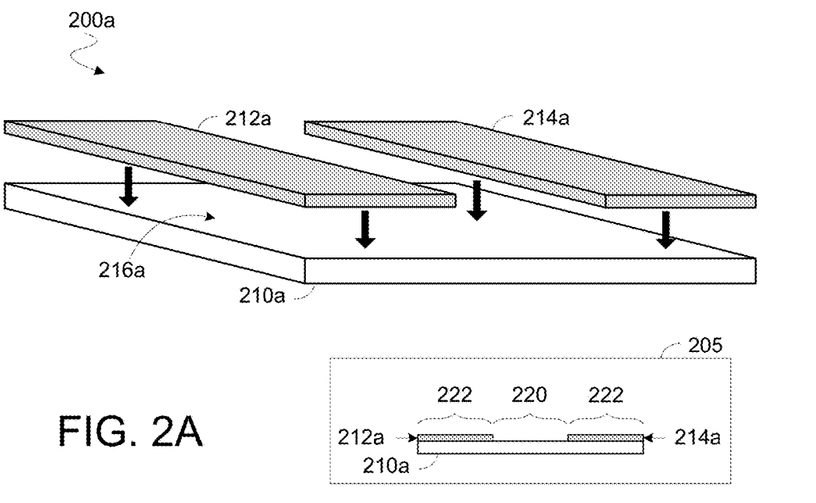
FIGS. 2A through 2D are high-level views each illustrating elements of a respective stage of fabrication for a tunable resonator device according to an embodiment.

FIG. 2A shows the stage 200a of fabrication during which a patterned layer of adhesive material is disposed on a surface 216a of a board 210a, the patterned layer including regions 212a, 214a of the adhesive material. Board 210a may include some or all of the features of board 110, for example. The patterned layer may be laser cut or die cut and applied by techniques such as those for forming regions 112, 114. As shown in the detailed cross-sectional view 205, regions 212a, 214a may define at least in part one or more channel boundary regions 222 that adjoin and limit the extent of a region 220 that is to accommodate a LC channel.

Figure 2B:
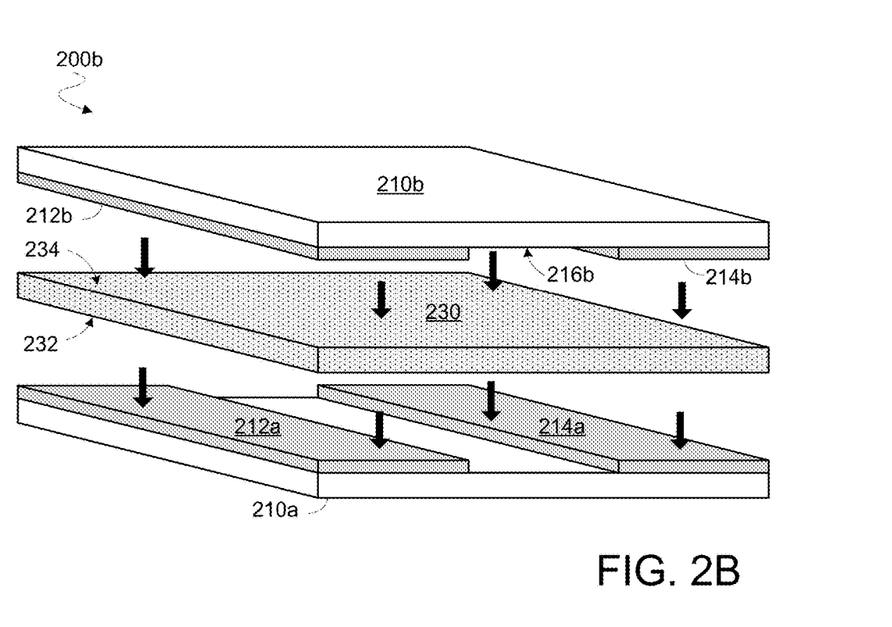
Figure 2C:
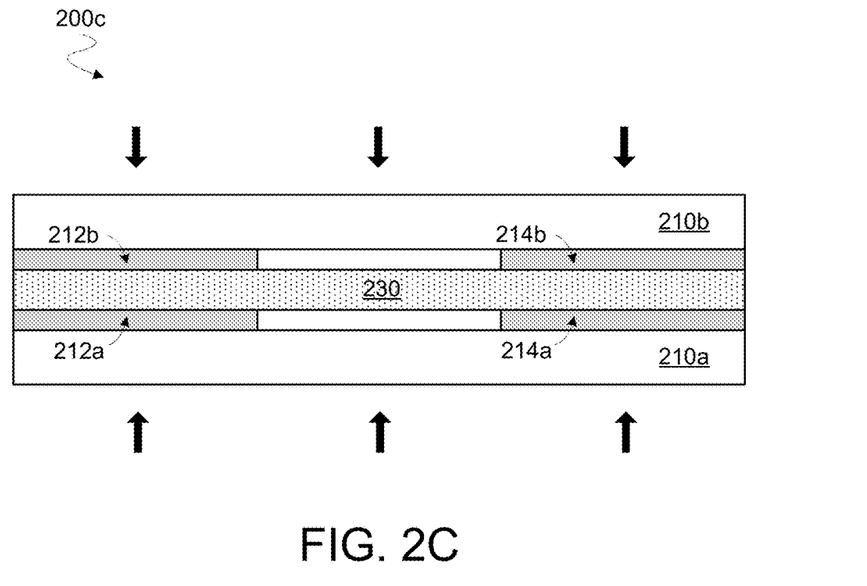

As shown in FIG. 2B, a fabrication stage 200b includes aligning the assembly formed at stage 200a with a similar assembly that comprises, for example, another board 210b and regions 212b, 214b of adhesive material disposed on a surface 216b of board 210b. Board 210b may provide a functionality that is complementary to that of board 210a—e.g. where board 210a and second board 210b are, respectively, an iris board and a patch board. During stage 200b, a membrane 230 may be aligned between these two assemblies. Membrane 230 may comprise ePTFE, UHMWPE, or other such low dielectric constant, low loss tangent material. By way of illustration and not limitation, a relative dielectric constant of membrane 230 may be within a range between 2.0 and 3.5 and/or a loss tangent of membrane 230 may be in a range between 0.00001 and 0.001.

Portions of the aligned membrane 230 may variously overlap some or all of regions 212a, 212b, 214a, 214b, where another portion of membrane 230 overlaps an exposed portion of side 216a and/or an exposed portion of side 216b. During a stage 200c shown in FIG. 2C, lamination of boards 210a, 210b and membrane 230 may take place, wherein such lamination results in adhesive material variously wicking from regions 212a, 212b, 214a, 214b into micropores of membrane 230. In another embodiment, membrane 230 is a microfibrous or nanofibrous material, wherein adhesive material wicks into regions between fibers of membrane 230. As shown by stage 200d of FIG. 2D, the resulting laminate includes an intermediary layer between boards 210a, 210b that comprises a first portion 240 of the membrane 230 that is to accommodate a LC channel. The intermediary layer further comprises one or more channel boundary regions 242 that are to define at least in part a boundary to such a LC channel.

Figure 2D:
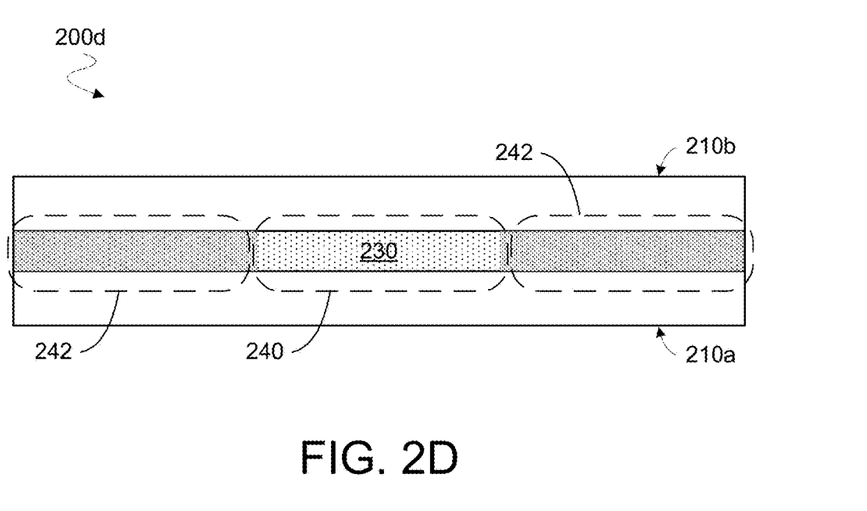

The adhesive material may permeate membrane 230 from the top and bottom to form a liquid-tight seal of the one or more channel boundary regions 242. However, such wicking may not extend laterally to a significant extent. Consequently, the LC channel dimensions may remain fairly consistent, after lamination, with the original adhesive layer pattern. During or after stage 200d, a liquid crystal material may be injected, vacuum filled or otherwise disposed within micropores of region 240 to form the LC channel.

Figure 3:
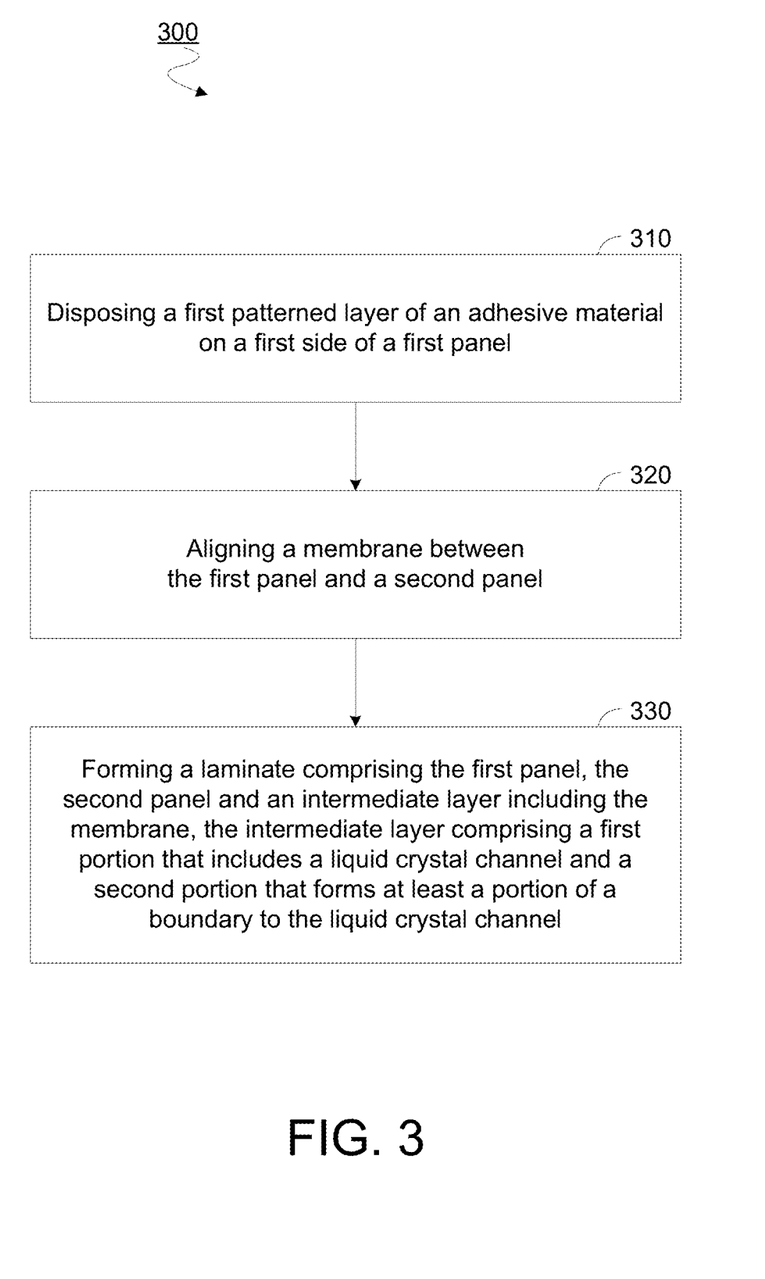
FIG. 3 is a flow diagram illustrating elements of a method of fabricating a tunable resonator device according to an embodiment.

FIG. 3 illustrates elements of a method 300 for fabricating a tunable RF device according to an embodiment. Method 300 may include, for example, some or all of the processing illustrated by FIG. 1A, 1B or by FIGS. 2A through 2D.

Method 300 includes, at 310, disposing a first patterned layer of an adhesive material on a first side of a first panel. The first panel may include, for example, a first substrate and a first metal layer. The disposing at 310 may include processing such as that of stage 100 or stage 200a, for example. After the disposing at 310, method 300 may, at 320, align a membrane between the first panel and a second panel that includes a second substrate and a second metal layer. The membrane may include interstices such as micropores or regions between microfibers or nanofibers. The first panel and the second panel may each comprise a respective one of an iris panel and a patch panel. For example, a metal layer of the first panel may form a slot, wherein a width of the slot is between 2.3 and 2.7 mm. In such an embodiment, a metal layer of the second panel may form a patch to be aligned with the slot, wherein a width of the patch is between 2 mm and 3 mm. However, the dimensions of such a patch and slot are merely illustrative, and may vary according to implementation specific details, such as frequency of operation, that are not limiting on certain embodiments.

The aligning at 320 may include movement of one or more of the membrane, the first panel and the second panel. In one embodiment, the aligning at 320 includes or is based on a positioning of soldermask posts on one of the first panel and the second panel. Such soldermask posts may aid and/or maintain a positioning of the membrane—e.g., where adhering the membrane to the location between the soldermask posts may include adhering the membrane adjacent to the soldermask posts.

Method 300 may further comprise, at 330, forming a laminate comprising the first panel, the second panel and an intermediate layer including the membrane. The intermediate layer may include a first portion comprising first interstices (e.g., micropores or regions between fibers) of the membrane and a liquid crystal material disposed in the first interstices. The first portion may include a liquid crystal channel—e.g., where forming the laminate at 330 includes infusing the liquid crystal material into the first interstices after the adhesive material is disposed in the second interstices. A second portion of the intermediate layer may comprise second interstices of the membrane and a portion of the adhesive material disposed in the second interstices. The second portion may form at least part of a boundary to the liquid crystal channel.

In an embodiment, the first patterned layer forms a gasket portion of the intermediate layer, where the gasket portion is outside of the membrane and is in direct contact with both the first side and the second side. In another embodiment, a second patterned layer of adhesive material is disposed on a second side of the second panel before the membrane is aligned at 320. A pattern of the second patterned layer may, for example, match a pattern of the first patterned layer.

At least a portion of the membrane may adjoin the first side of the first panel and/or the second side of the second panel. Alternatively, the membrane may not be in direct contact with the first panel or the second panel. For example, method 300 may further comprise operations (not shown) to dispose a spacer between the first side and the membrane, and to further dispose another spacer between the second side and the membrane. In such an embodiment, the spacers may provide for a cavity region that separates a side of the liquid crystal channel from the first side, and for another cavity region that separates another side of the liquid crystal channel from the second side.

Figure 4A:
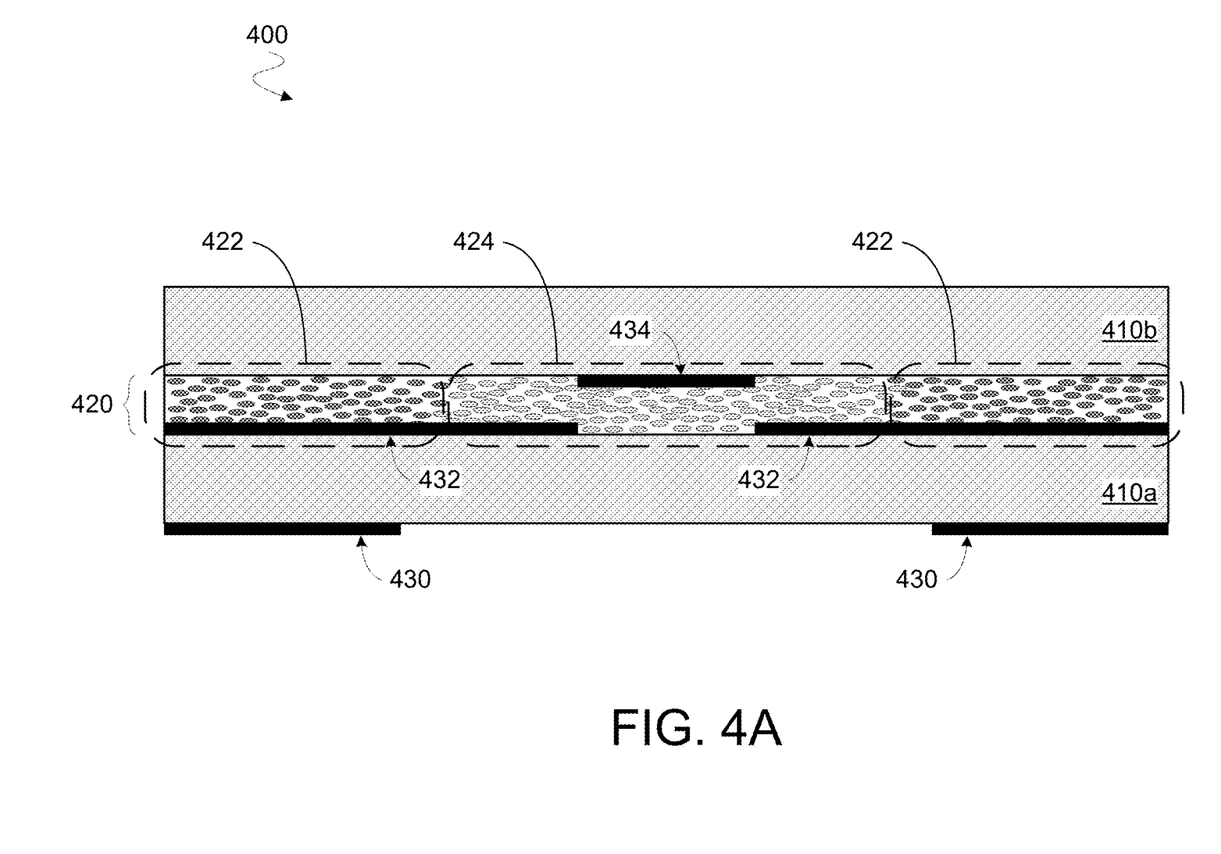
FIGS. 4A and 4B are cross-sectional views each illustrating elements of a respective tunable resonator device according to a corresponding embodiment.

FIG. 4A is a cross-sectional view of a RF resonator device 400 according to one embodiment. Device 400 may include some or all of the features of a device such as that fabricated by the processing illustrated in FIGS. 2A through 2D. For example, device 400 may be fabricated by method 300.

Device 400 may include a board 410a comprising metal layers 430, 432 and another board 410b including a metal layer 434. An intermediary layer 420 disposed between boards 410a, 410b may comprise a first portion 424 of a membrane, wherein interstices (e.g., micropores or regions between fibers) of portion 424 have a liquid crystal material disposed therein. One or more other portions 422 of the membrane may include other interstices having an adhesive material disposed therein, where the one or more portions 422 form a seal that defines at least part of a boundary to a LC channel included in portion 424. Intermediary layer 420 may have a thickness between boards 410a, 410b that, for example, is between 1 mil and 5 mils.

In the illustrative embodiment shown by FIG. 4A, device 400 includes metal layers of a patch antenna. For example, one or each of metal layers 430, 432 may function as a respective ground plane, where metal layer 424 provides a patch aligned with respective iris structures formed by metal layers 430, 432. However, device 400 may include any of a variety of additional or alternative arrangements of such metal layers, according to different embodiments. The features of metal layers 430, 432, 434—e.g., their relative sizes and their configurations with respect to one another—are not necessarily to scale as shown. The structures shown in FIG. 4A may be those of one antenna element, where device 400 may further comprise one or more other similar antenna elements (not shown).

Figure 4B:
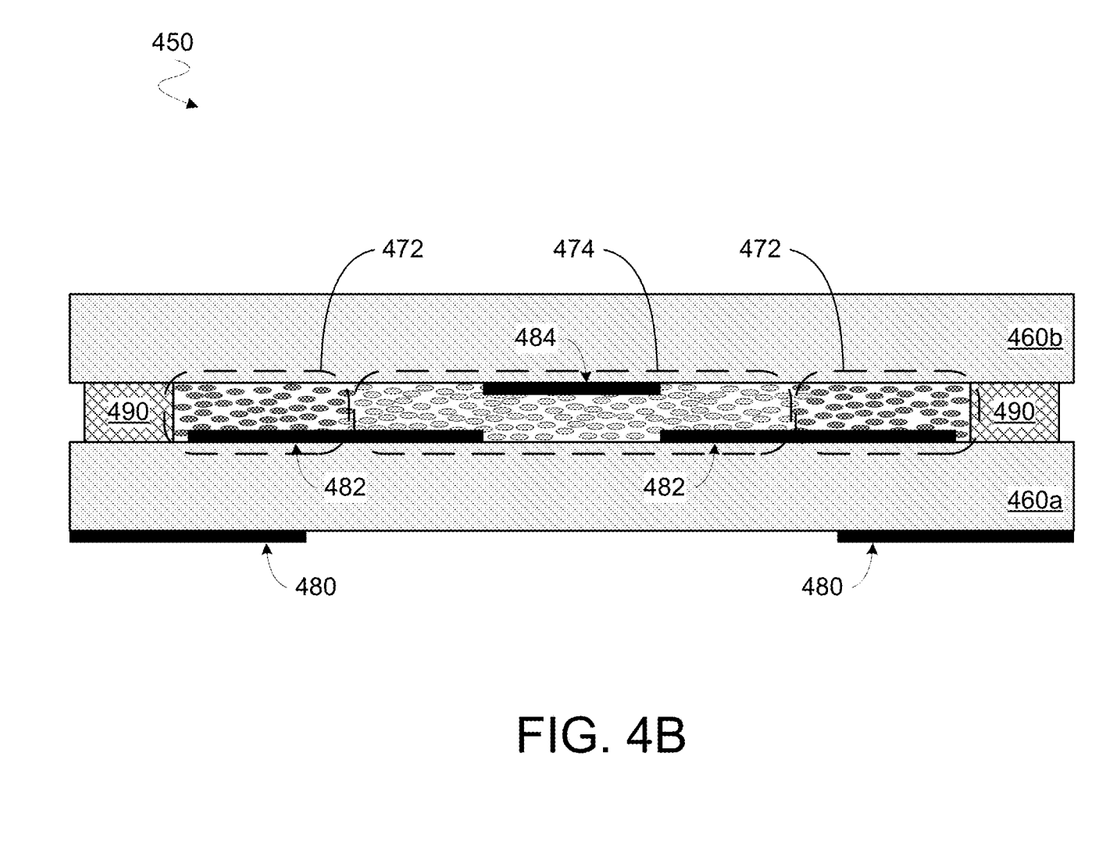

FIG. 4B is a cross-sectional view of a resonator device 450 according to another embodiment, wherein soldermask posts 490 are provided to facilitate positioning of a membrane in the LC channel. Resonator device 450 may include one or more features of resonator device 400, for example.

In an embodiment, device 450 includes boards 460a, 460b and an intermediary layer disposed between boards 460a, 460b. Board 460a may comprise one or more metal layers, as represented by the illustrative metal layers 480, 482. Alternatively or in addition, board 460b may comprise a metal layer 484. However, device 450 may include any of a variety of additional or alternative arrangements of such metal layers, according to different embodiments. A first portion 474 of a membrane in the intermediary layer may include interstices (e.g., micropores or regions between fibers) having a LC material disposed therein. One or more other portions 472 of the membrane may include interstices having disposed therein an adhesive material that defines a boundary to a LC channel of portion 474. The membrane may be positioned between—e.g., adjacent to—soldermask posts 490 that are bonded to board 460a and/or to board 460b.

Figure 5A:
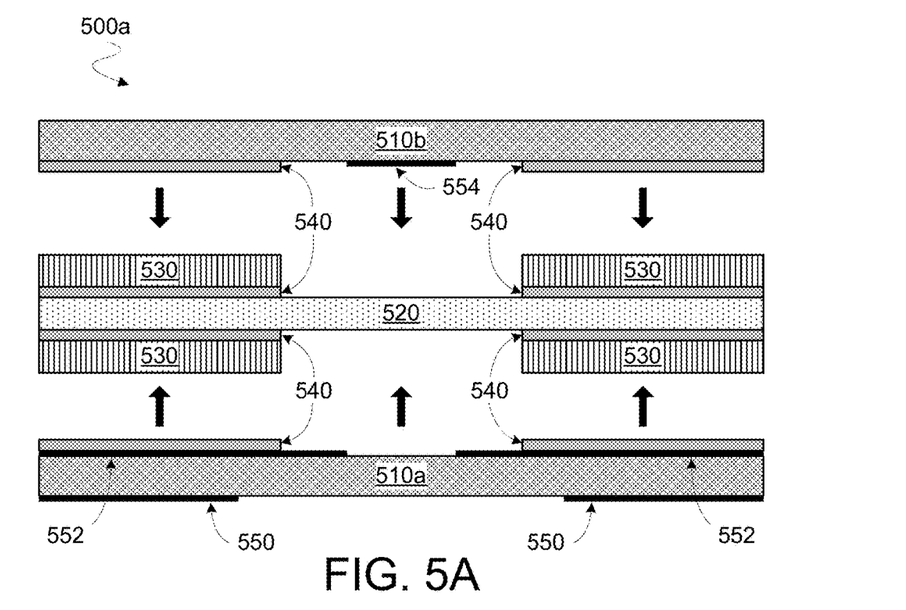
FIGS. 5A and 5B are cross-sectional views each illustrating elements of respective stage of fabrication for a tunable resonator device according to an embodiment.
Figure 5B:
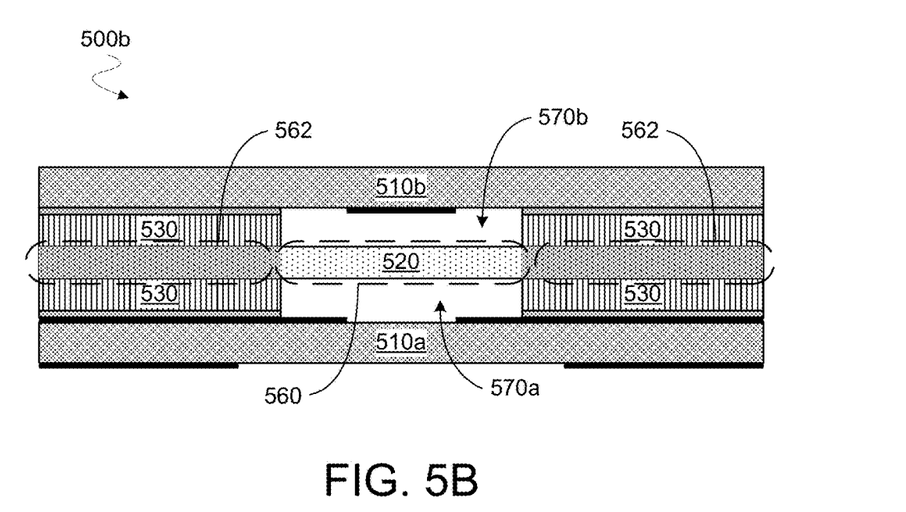

FIGS. 5A, 5B illustrate respective cross-sectional views 500a, 500b of a process to fabricate a RF resonator device according to an embodiment. The process represented by FIGS. 5A, 5B may include some or all of the features of method 200, for example.

As shown in FIG. 5A, stage 500a may include aligning, with respect to one another, a microporous membrane 530, boards 510a, 510b and spacers 530 that are variously positioned each between microporous membrane 520 and a respective one of boards 510a, 510b. Patterned layers 540 of adhesive material may be variously disposed on respective sides of boards 510a, 510b and/or spacers 530—e.g., according to the illustrative arrangement shown. Spacers 530 may comprise any of a variety of low dielectric constant and/or low loss tangent materials, such as polyester, KAPTON® or the like. In one illustrative embodiment, patterned layers 540 may be 1 to 2 mils thick, spacers 530 may be 1 mil to 4 mils thick and/or microporous membrane 520 may be 1 mil to 5 mils thick. However, such dimensions may vary according to implementation specific details that are not limiting on certain embodiments.

The resonator device may comprise one or more metal layers, as represented by the illustrative metal layers 550, 552 of board 510a and metal layer 554 of board 510b. However, any of a variety of additional or alternative metal layers may be included in the resonator device, according to different embodiments. In the illustrative embodiment shown, patterned layers 540 of adhesive material are variously disposed on boards 510a, 510b prior to lamination with microporous membrane 520 and spacers 530. However, certain embodiments are not limited with respect to the particular surfaces where pattern players 540 are initially applied, or the particular order in which membrane 520, boards 510a, 510b and spacers 530 are variously adhered to one another.

At stage 500b, lamination of the aligned boards 510a, 510b with microporous membrane 520 and spacers 530 has taken place. After which, one or more portions 562 of microporous membrane 520 may have disposed therein adhesive material that is from patterned layers 540. During or after stage 500b, LC material may be injected, vacuum filled or otherwise disposed within micropores of a region 560 of microporous membrane 520 to form a LC channel therein. The one or more portions 562 may define at least in part a boundary of such a LC channel.

Spacers 530 may support the formation of cavity regions 570a, 570b each between a respective side of microporous membrane 520 and one of boards 510a, 510b. For example, microporous membrane 520 may occupy ⅕th of an overall distance between boards 510a, 510b—e.g., wherein microporous membrane 520 is 25 microns thick and boards 510a, 510b are separated by 125 microns. Suspension of the LC channel between boards 510a, 510b may provide for improved tuning responsiveness, for example. Although certain embodiments are not limited in this regard, a space between boards 510a, 510b may be between 25 microns and 125 microns thick. Alternatively or in addition, membrane 520 may be positioned in the middle of such a space.

In the illustrative embodiment represented by stage 500b, the region 560 of membrane 520 is suspended between a patch formed by metal layer 554 and a hole formed by metal layer 552. In some embodiments, the resonator device may include additional structures (not shown) to further support the suspended region 560. For example, the resonator device may further include a first soldermask post extending from the patch formed by middle layer 554 to the top side of membrane 520 in region 560. Alternatively or in addition, the resonator device may include a second soldermask post extending from board 510*a* at the hole formed by metal layer 552 to the bottom side of membrane 520 in region 560.

Figure 6:
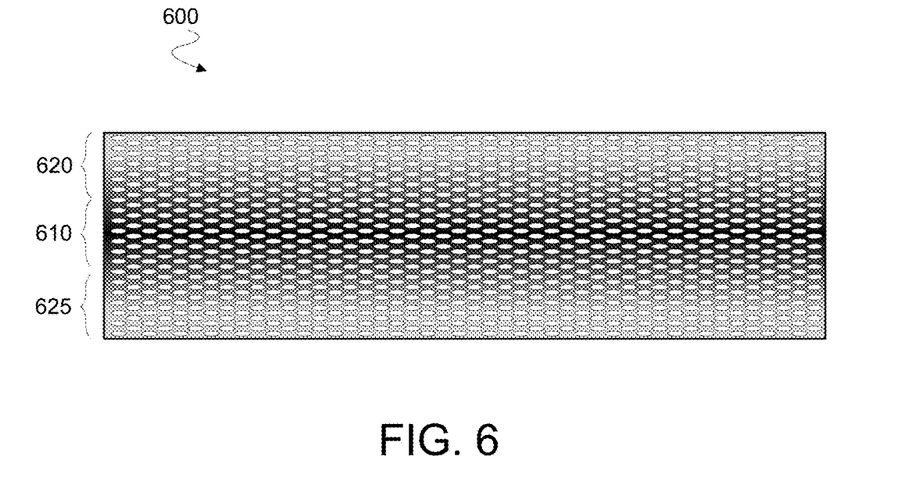
FIG. 6 is a cross-sectional view illustrating elements of a micro-porous membrane of a tunable resonator device according to an embodiment.

FIG. 6 illustrates elements of a microporous membrane 600 to be included in a RF resonator device according to an embodiment. Membrane 600 may provide functionality such as that discussed herein with respect to membranes 118, 230, 520, etc. In an embodiment, microporous membrane 600 comprises ePTFE (or other such low dielectric constant and/or low loss tangent material) that has been treated to include a hydrophilic inner region 610 within hydrophobic outer regions 620, 625. For example, microporous membrane 600 may be selectively treated—e.g., where regions 620, 625 are isolated from such treatment—with a hydrophilic coating and/or oxygen plasma processing to make the material of region 610 comparatively hydrophilic, as compared to regions 620, 625. In one embodiment, regions 620, 625 may each have a thickness between 5 microns and 25 microns—e.g., where region 610 has a thickness between 25 microns and 100 microns. However, such dimensions may vary, according to implementation-specific details. As a result of such treatment, a liquid crystal material, being highly polar, may be attracted toward region 610, and more excluded by regions 620, 625. Thus, the hydrophobic regions 620, 625 may act as barriers, permitting the saturated membrane 600 to be easily handled without exposure to the liquid crystal material.

Figure 7:
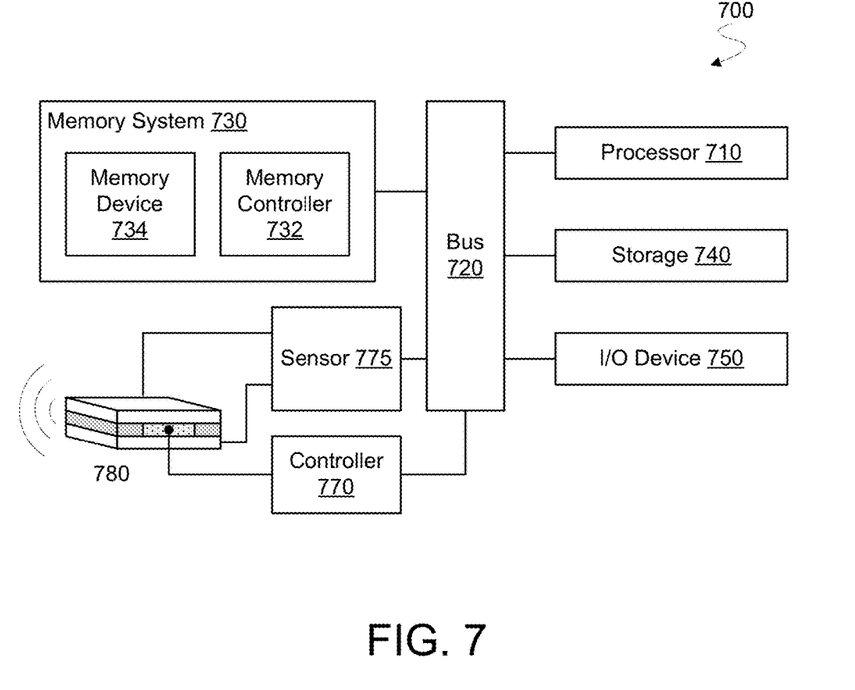
FIG. 7 is a high-level block diagram illustrating elements of a hardware platform according to an embodiment.

FIG. 7 illustrates elements of a platform 700 including a tunable resonator 780 according to an embodiment. Platform 700 may comprise a hardware platform of a desktop computer, laptop computer, handheld device (e.g., smart phone, palmtop computer, etc.) game console or other such system. Resonator 780 may include LC channel structures having features variously discussed herein. A controller 770 of platform 700 may comprise circuitry coupled to apply an electric field to an LC channel of resonator 780. A sensor 775 (e.g., a receiver/transmitter) may include circuitry to exchange signals via resonator 780—e.g., where the LC channel is tuned in one or more respects by controller 770 for such a signal exchange. Tuning and/or operation of resonator 780 may include operations based on conventional resonator control/signaling techniques, which are not detailed herein and are not limiting on certain embodiments.

In an embodiment, resonator 780 serves as an antenna or other mechanism to facilitate communication on behalf of a host of platform 700. By way of illustration and not limitation, such a host may include one or more processors, such as the illustrative processor 710. One or more interconnects, as represented by the illustrative bus 720, may couple processor 710 to controller 770, sensor 775 and/or one or more components of platform 700.

In an embodiment, such one or more components may include a memory system 730 comprising a memory controller and a memory device 734 (e.g., a dynamic random access memory). Memory device 734 may store instructions, data and/or other information that, for example, support execution of an operating system or other software by processor 710. A storage 740 of platform 700—e.g., including a hard disk drive and/or a solid state drive—may provide non-volatile storage of data to be made available to processor 710. In an embodiment, one or more input/output (I/O) devices 750—e.g., including a touchscreen, touchpad, keyboard, speaker, network interface and/or the like—may support exchanges to and/or from the platform 700 that are based on and/or determine signal exchanges via resonator 780.

Techniques and architectures for providing a resonator device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A tunable resonator device comprising:
   a first panel including a first substrate and a first metal layer, wherein the first panel comprises an iris panel;
   a second panel including a second substrate and a second metal layer, wherein the second panel comprises a patch panel; and
   an intermediate layer disposed between the first panel and the second panel, the intermediate layer including:
      a liquid crystal channel including a first portion of a membrane and a liquid crystal material disposed in first interstices of the first portion;
      a channel boundary portion adjacent to the liquid crystal channel, the channel boundary portion including a second portion of the membrane and an adhesive material disposed in second interstices of the second portion.

2. A tunable resonator device comprising:
   a first panel including a first substrate and a first metal layer;
   a second panel including a second substrate and a second metal layer; and
   an intermediate layer disposed between the first panel and the second panel, the intermediate layer including:
      a liquid crystal channel including a first portion of a membrane and a liquid crystal material disposed in first interstices of the first portion;
      a channel boundary portion adjacent to the liquid crystal channel, the channel boundary portion including a second portion of the membrane and an adhesive material disposed in second interstices of the second portion;
   a first spacer disposed between a first side of the first panel and the intermediate layer; and
   a second spacer disposed between a second side of the second panel and the intermediate layer;
   wherein a first cavity region adjacent to the first spacer separates a side of the liquid crystal channel from the first side of the first panel, and wherein a second cavity region adjacent to the second spacer separates another side of the liquid crystal channel from the second side of the second panel.

3. The tunable resonator device of claim 2, further comprising a soldermask post extending through the first cavity region between the first side of the first panel and the intermediate layer.

4. A tunable resonator device comprising:
   a first panel including a first substrate and a first metal layer;
   a second panel including a second substrate and a second metal layer; and
   an intermediate layer disposed between the first panel and the second panel, the intermediate layer including
      a liquid crystal channel including a first portion of a membrane and a liquid crystal material disposed in first interstices of the first portion;
      a channel boundary portion adjacent to the liquid crystal channel, the channel boundary portion including a second portion of the membrane and an adhesive material disposed in second interstices of the second portion, wherein the adhesive material forms a gasket portion of the intermediate layer, the gasket portion being in direct contact with both a first side of the first panel and a second side of the second panel.

5. A tunable resonator device comprising:
   a first panel;
   a second panel; and
   an intermediate layer disposed between the first panel and the second panel, the intermediate layer including:
      a liquid crystal channel including a first portion of a membrane and a liquid crystal material disposed in first interstices of the first portion;
      a channel boundary portion adjacent to the liquid crystal channel, the channel boundary portion including a second portion of the membrane and an adhesive material disposed in second interstices of the second portion;
   a first spacer disposed between the membrane and the first panel; and
   a second spacer disposed between the membrane and the second panel, wherein the liquid crystal channel is suspended by the first and second spacers between the first panel and the second panel, respectively.

6. The tunable resonator device of claim 5, wherein the first panel comprises an iris panel and wherein the second panel comprises a patch panel.

7. The tunable resonator device of claim 5, wherein the membrane comprises expanded polytetrafluoroethylene.

8. The tunable resonator device of claim 5, further comprising:
   soldermask posts disposed between the first panel and the second panel, wherein the membrane is located between the soldermask posts.

9. A tunable resonator device comprising:
   a first panel including a first substrate and a first metal layer;
   a second panel including a second substrate and a second metal layer; and
   an intermediate layer disposed between the first panel and the second panel, the intermediate layer including:
      a liquid crystal channel including a first portion of a membrane and a liquid crystal material disposed in first interstices of the first portion;
      a channel boundary portion adjacent to the liquid crystal channel, the channel boundary portion including a second portion of the membrane and an adhesive material disposed in second interstices of the second portion, wherein the membrane includes two hydrophobic outer regions and a hydrophilic inner region located between the two hydrophobic outer regions, the hydrophilic inner region being at least a part of the first portion of the membrane and at least one of the two hydrophobic outer regions being part of the second portion of the membrane.

10. A method comprising:
    disposing on a first side of a first panel a first patterned layer of an adhesive material, the first panel including a first substrate and a first metal layer;

after disposing the first patterned layer of adhesive material, aligning a membrane between the first panel and a second panel including a second substrate and a second metal layer;

forming a laminate including the first panel, the second panel and an intermediate layer including the membrane, wherein the intermediate layer includes:

a first portion comprising first interstices of the membrane and a liquid crystal material disposed in the first interstices, wherein the first portion forms a liquid crystal channel; and a second portion comprising second interstices of the membrane and a portion of the adhesive material disposed in the second interstices, wherein the second portion forms at least part of a boundary to the liquid crystal channel.

11. The method of claim 10, before aligning the membrane between the first panel and the second panel, disposing on a second side of the second panel a second patterned layer of the adhesive material.

12. The method of claim 11, wherein a pattern of the second patterned layer matches a pattern of the first patterned layer.

13. The method of claim 11, further comprising:
disposing a first spacer between the first side of the first panel and the membrane; and
disposing a second spacer between the second side of the second panel and the membrane;
wherein a first cavity region separates a side of the liquid crystal channel from the first side of the first panel, and wherein a second cavity region separates another side of the liquid crystal channel from the second side of the second panel.

14. The method of claim 13, further comprising: disposing a soldermask post between the first side of the first panel and the intermediate layer, wherein the soldermask post extends through the first cavity region.

15. The method of claim 11, wherein at least a portion of the adhesive material forms a gasket portion of the intermediate layer, the gasket portion in direct contact with both the first side of the first panel and the second side of the second panel.

16. The method of claim 10, wherein the first panel comprises an iris panel of the laminate and wherein the second panel comprises a patch panel of the laminate.

17. The method of claim 10, wherein forming the laminate includes infusing the liquid crystal material into the first interstices after the adhesive material is disposed in the second interstices.

18. The method of claim 10, further comprising:
positioning soldermask posts between the first panel and the second panel, wherein the forming the laminate includes adhering the membrane to a location between the soldermask posts.

19. The method of claim 18, wherein adhering the membrane to the location between the soldermask posts includes adhering the membrane adjacent to the soldermask posts.

20. A tunable resonator device comprising:
a first panel including a first substrate and a first metal layer;
a second panel including a second substrate and a second metal layer; and
an intermediate layer disposed between the first panel and the second panel, the intermediate layer including:
a liquid crystal channel including a first portion of a membrane and a liquid crystal material disposed in first interstices of the first portion;
a channel boundary portion adjacent to the liquid crystal channel, the channel boundary portion including a second portion of the membrane and an adhesive material disposed in second interstices of the second portion, wherein the membrane comprises a microporous material or a nanofibrous material.

21. A tunable resonator device comprising:
a first panel including a first substrate and a first metal layer;
a second panel including a second substrate and a second metal layer; and
an intermediate layer disposed between the first panel and the second panel, the intermediate layer including:
a liquid crystal channel including a first portion of a membrane and a liquid crystal material disposed in first interstices of the first portion;
a channel boundary portion adjacent to the liquid crystal channel, the channel boundary portion including a second portion of the membrane and an adhesive material disposed in second interstices of the second portion; and
soldermask posts disposed between the first panel and the second panel, wherein the first and second portions of the membrane are located between the soldermask posts.

22. The tunable resonator device of claim 21, wherein the first and second portions of the membrane are adjacent to the soldermask posts.

* * * * *